No. 675,389. Patented June 4, 1901.
R. M. KEATING.
MOTOR BICYCLE.
(Application filed July 6, 1900.)
(No Model.) 2 Sheets—Sheet 2.
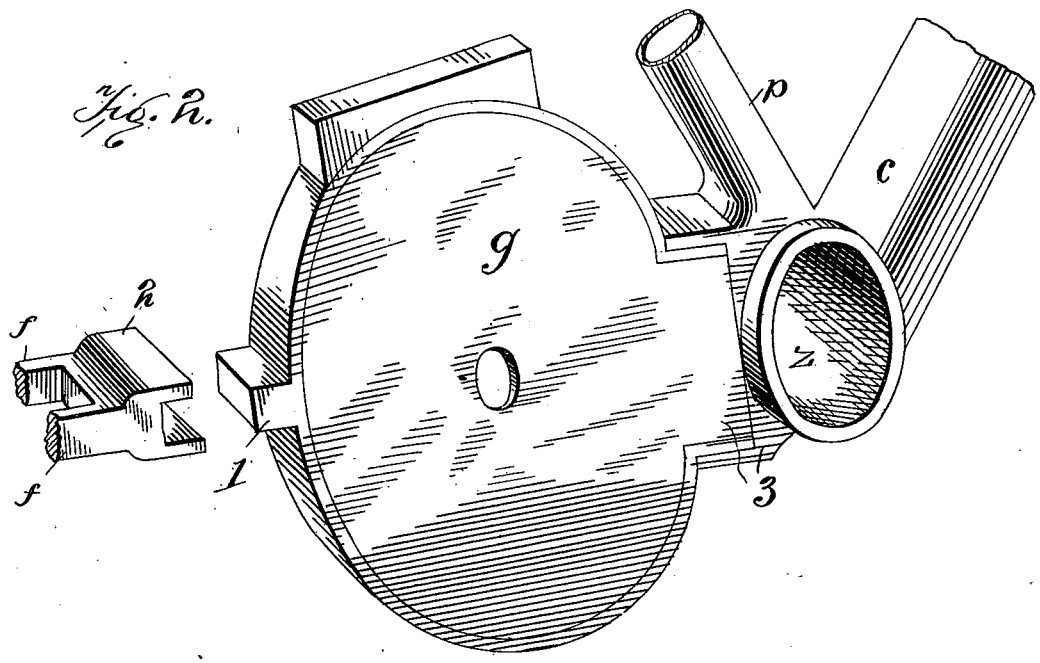
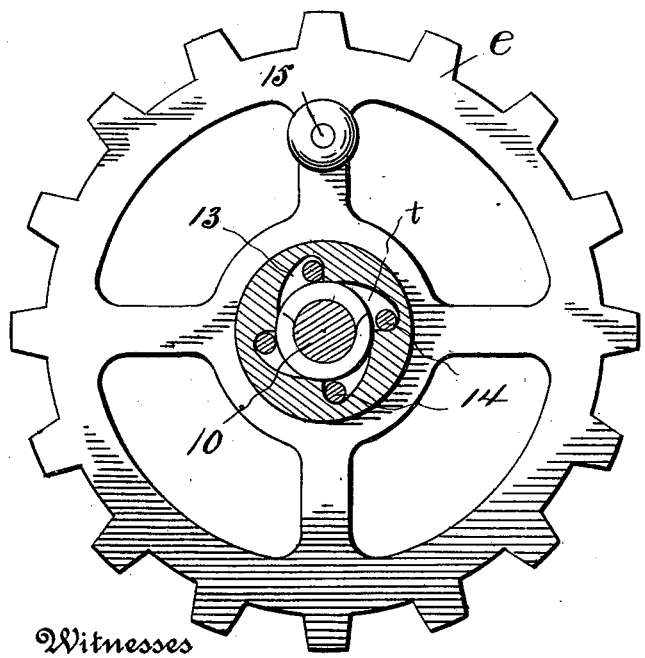
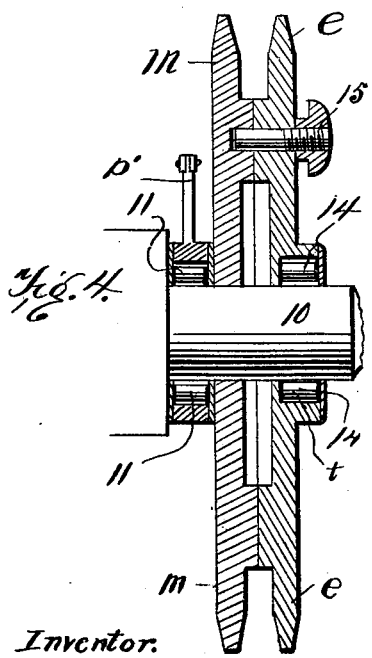
Witnesses
Chas. R. Davies.
W. H. Bartlett.
Inventor.
Robert M. Keating

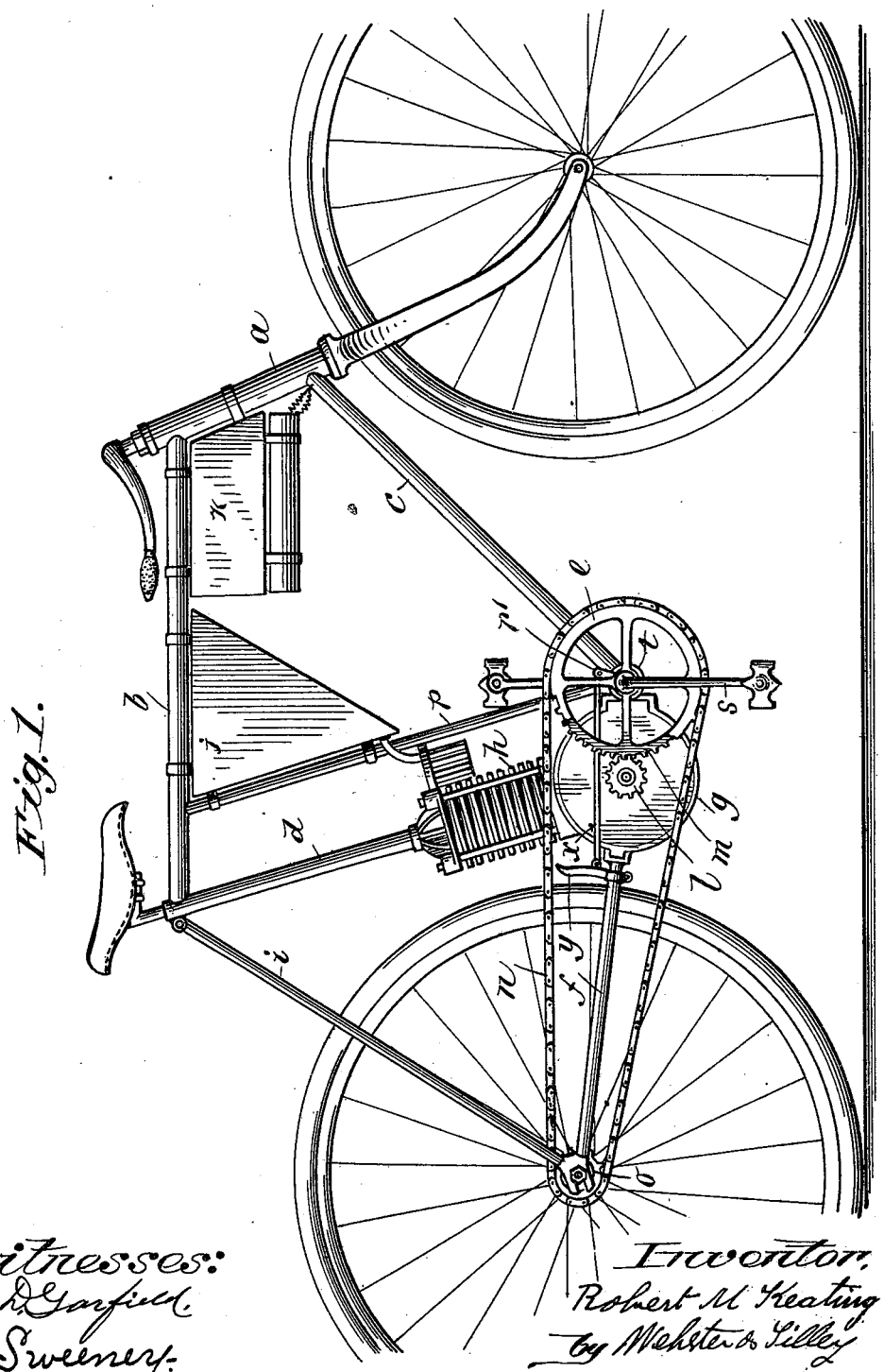

UNITED STATES PATENT OFFICE.

ROBERT M. KEATING, OF MIDDLETOWN, CONNECTICUT, ASSIGNOR TO R. M. KEATING MOTOR COMPANY, OF PORTLAND, MAINE.

MOTOR-BICYCLE.

SPECIFICATION forming part of Letters Patent No. 675,389, dated June 4, 1901.

Application filed July 6, 1900. Serial No. 22,662. (No model.)

*To all whom it may concern:*

Be it known that I, ROBERT M. KEATING, a citizen of the United States of America, residing at Middletown, in the county of Middlesex and State of Connecticut, have invented new and useful Improvements in Motor-Bicycles, of which the following is a specification, reference being had to the accompanying drawings and characters of reference marked thereon.

The object of my invention is to provide a construction of motor-bicycle which will be strong, easily operative, light, and superior to motor-vehicles heretofore made.

My object is further to provide a construction wherein a supplementary driving mechanism is not required for the motor—that is to say, a construction wherein the pedal driving mechanism and the motor driving mechanism may be operated together, each utilizing the same means for transmitting the power to the driving-wheel of the vehicle.

My object is further to provide an improved and more rigid construction of frame and to provide a construction wherein the motor forms a part of the bracing or framework of the vehicle.

I accomplish the objects of my invention by the construction herein shown and described.

The general construction of the machine is described in my application, Serial No. 20,632, filed June 18, 1900, and in my application, Serial No. 22,479, filed July 5, 1900.

In the accompanying drawings, in which like characters of reference indicate like parts, Figure 1 is a side elevation illustrating one method of carrying out my invention, and Fig. 2 is a broken perspective of engine-casing and parts of frame, illustrating assembled position. Fig. 3 is a side elevation and partial section of the driving-sprocket. Fig. 4 is a vertical section of the driving sprocket-wheel and sprocket gear-wheels and connections.

In detail, $a$ indicates the head; $b$, the top bar; $c$, the lower front bar; $d$, the motor-bar; $e$, pedal sprocket-wheel; $f$, lower rear bars; $g$, motor-case; $h$, motor-cylinder; $i$, upper rear bars; $j$, fuel-reservoir and carbureter; $k$, battery; $l$, motor driving-wheel; $m$, sprocket-wheel gear; $n$, sprocket-chain; $o$, rear-wheel sprocket; $p$, center brace; $r$, brake-arm; $s$, pedal crank-arm; $t$, clutch mechanism; $x$, brake-rod, and $y$ brake.

$z$ is the pedal-shaft hanger.

The motor-casing $g$ has a rib 1 on its outer surface, extending in a direction parallel with the axis of the casing. The front ends of the lower rear bars $f$ are forked, as at 2, and the forks of the bars clasp the rib on the casing. The forks may be secured to the ribs by pins or screws or any other usual mode of fastening. The front part of the motor-casing has a rib 3, which comes in contact with the lower end of the brace $p$, to which the motor-casing is secured in any suitable manner. The lower rear bars $f$ are thus connected to the brace $p$ by the casing of the motor. Bars $f$ brace the motor-casing from each side, while the bar $p$ supports the casing centrally at its front. Thus the motor-cylinder $h$ forms a part of the bracing or framework of the frame, the post $d$ being attached to the top of the cylinder-casing and extending upwardly and preferably attached to the top bar $b$ at or near the point of connection with the rear braces $r$, and to give the frame greater rigidity I prefer to employ an intermediate brace or bar $p$, extending from a point upon or adjacent to the crank-hanger bracket upwardly to the top bar $b$.

The case $g$ is provided with a suitable opening through which the piston-rod and pitman of the motor operate, engaging a crank-shaft, which crank-shaft is operatively connected with a driving-wheel $l$, this being by preference a gear, and the driving-wheel may be mounted directly upon the motor crank-shaft or mounted upon mechanism operatively connected with said crank-shaft, whereby the number of revolutions per minute is reduced, this feature being dependent upon the type of motor employed. If a gas-motor of the ordinary type is employed having a great number of revolutions per minute, then it is desirable that reducing mechanism be interposed between the motor and the driving-wheel, and any construction may be employed, comprising a reducing mechanism between the driving-wheel $l$ and the sprocket-wheel $e$.

I also provide a clutch mechanism by which I am enabled to lock the pedal crank-shaft to the pedal sprocket-wheel. Thus I can start the motor and at the same time drive the bicycle forwardly by operating on the pedals, and, if desired, the vehicle may be propelled by the combined forces of the rider and the motor, and, if desired, the motor driving mechanism may be unlocked from the pedal driving mechanism and the vehicle propelled by the pedals alone, or by stopping movement of the pedals the pedal crank-shaft can be unlocked from the sprocket-wheel $l$ and the vehicle be then driven forwardly by the action of the motor alone.

The sprocket gear-wheel $m$ is mounted on the pedal crank-shaft 10, which shaft carries the brake-arm $p'$. The brake is thrown into operation by back-pedaling by means of clutch 11, operating as usual. The forward movement of the pedal-shaft may be more effective as an auxiliary driving force by means of clutch $t$, which consists of inclined surfaces 13 on the interior of the hub of sprocket $e$ and rolls 14, interposed between the same and shaft 10, as is common in driving bicycles. The driving-wheel $m$ and the sprocket $e$ may be coupled together by any simple coupling, as by pin 15, extending through the sprocket and into the driving wheel or pinion. By removing this pin or coupling 15 the connection to the engine is entirely removed, and the bicycle can then be driven by the pedals alone, as in ordinary bicycles.

The device is also provided with a collar and arm $r$ and a brake-rod and a brake, whereby by sufficient motion of the pedals backwardly the brake is carried against the rear wheel and the vehicle gradually brought to rest.

The detail of this mechanism is set forth in another application filed by me and is not therefore illustrated in detail herein.

Having therefore described my invention, what I claim, and desire to secure by Letters Patent, is—

1. The combination, in a motor-bicycle, of a pedal crank-shaft, a brake operatively connected thereto by a clutch to be worked by back-pedaling, a driving-pinion on said shaft and engaging the driving motor-engine to be propelled thereby, a sprocket-wheel and means for coupling or uncoupling the same with the driving-pinion, and means for driving the sprocket from the pedal-shaft, substantially as described.

2. In a motor-bicycle, the combination of the engine and its driving-gear, a pinion on the pedal-shaft driven by said gear, a driving-sprocket on the pedal-shaft connected to the driving-wheel, and means for coupling or uncoupling the sprocket-wheel and driving-pinion, all combined substantially as described.

3. The combination in a motor-bicycle of a crank-hanger bracket, a sleeve mounted therein, a gear and sprocket-wheel mounted on the sleeve, a pedal-shaft in the sleeve, a clutch between the pedal-shaft and sleeve, and a motor in operative relation with said gear.

4. The combination in a bicycle of a frame, comprising a head, a top bar $b$, lower bar $c$, rear bars $i$ and $f$, a center brace $p$, motor-cylinder $h$ and bar $d$ substantially as shown.

5. In a motor-bicycle, the combination of the motor-casing interposed between the rear lower bars of the frame and the pedal-shaft hanger, a pedal-shaft in said hanger carrying a sprocket operatively connected to the rear wheel of the bicycle, a driving-pinion on the pedal-shaft having operative engagement with the engine, and means for connecting said pinion and sprocket, or for permitting their independent rotation, all combined substantially as described.

6. The combination, in a motor-bicycle, of a suitable frame, a crank-hanger bracket on the frame, a sleeve in the bracket, a gear on the sleeve and a motor in operative relation with the gear, a wheel on the sleeve and means to transmit motion from said wheel to the driving-wheel of the bicycle, a crank-shaft in the sleeve, and a clutch between said sleeve and the crank-shaft.

7. In a motor-bicycle, the combination of the front and rear frame-bars and the motor-casing supported thereby, the motor-cylinder forming an upward extension of said casing, the seat-post connected to the top of the motor-cylinder and to the upper front and rear bars of the frame, and a brace connecting the upper and lower bars of the frame alongside the motor-cylinder, substantially as set forth.

8. In a motor-bicycle, the motor mounted on the frame and operatively connected to the driving-wheel of a bicycle, a pedal suitably supported on the frame, means for operatively engaging the pedal with the engine so that the forward movement of the pedal starts the engine, and means for operating the brake by the reverse movement of the pedal.

9. In a motor-bicycle, the motor mounted in the frame and operatively connected to the driving-wheel, a pedal supported on the frame and having operative engagement with the engine by forward movement of the pedal, a brake, and means for applying the brake by the reverse movement of the pedal while simultaneously disengaging the pedal from the engine.

ROBERT M. KEATING.

Witnesses:
DEXTER E. TILLEY,
ALLEN WEBSTER.